United States Patent [19]

Gonzalez

[11] 4,102,257
[45] Jul. 25, 1978

[54] STUFFING APPARATUS

[76] Inventor: Clemente Del Ser Gonzalez, Pasco Talleres No. 36, Villaverde Alto, Madrid, Spain

[21] Appl. No.: 768,055

[22] Filed: Feb. 14, 1977

[51] Int. Cl.² .............................................. A23D 1/00
[52] U.S. Cl. .................................................... 99/494
[58] Field of Search ................. 99/494, 544, 547–549, 99/561; 17/38, 42; 426/282

[56] References Cited

U.S. PATENT DOCUMENTS

| | | | |
|---|---|---|---|
| 2,597,933 | 5/1952 | Hungate | 99/494 |
| 2,643,694 | 6/1953 | Ashlock | 51/215 H |
| 2,991,813 | 7/1961 | Wilms | 99/494 |

Primary Examiner—Harvey C. Hornsby
Assistant Examiner—Robert Pous
Attorney, Agent, or Firm—Huebner & Worrel

[57] ABSTRACT

A stuffing apparatus for a machine adapted to deliver objects having cavities to be stuffed successively to a stuffing station, the stuffing apparatus having a feeding head borne by the machine in juxtaposition to the stuffing station; a slicing assembly mounted on the feeding head; a conveyor assembly for feeding a ribbon of stuffing material to the slicing assembly for successive severing into segments of the material; an assembly disposed between the feeding head and stuffing station for successively dilating the cavities of objects in the stuffing station; and a plunger mechanism adapted to thrust successive segments from the slicing assembly and feeding head and into the cavities of objects in the stuffing station.

15 Claims, 14 Drawing Figures

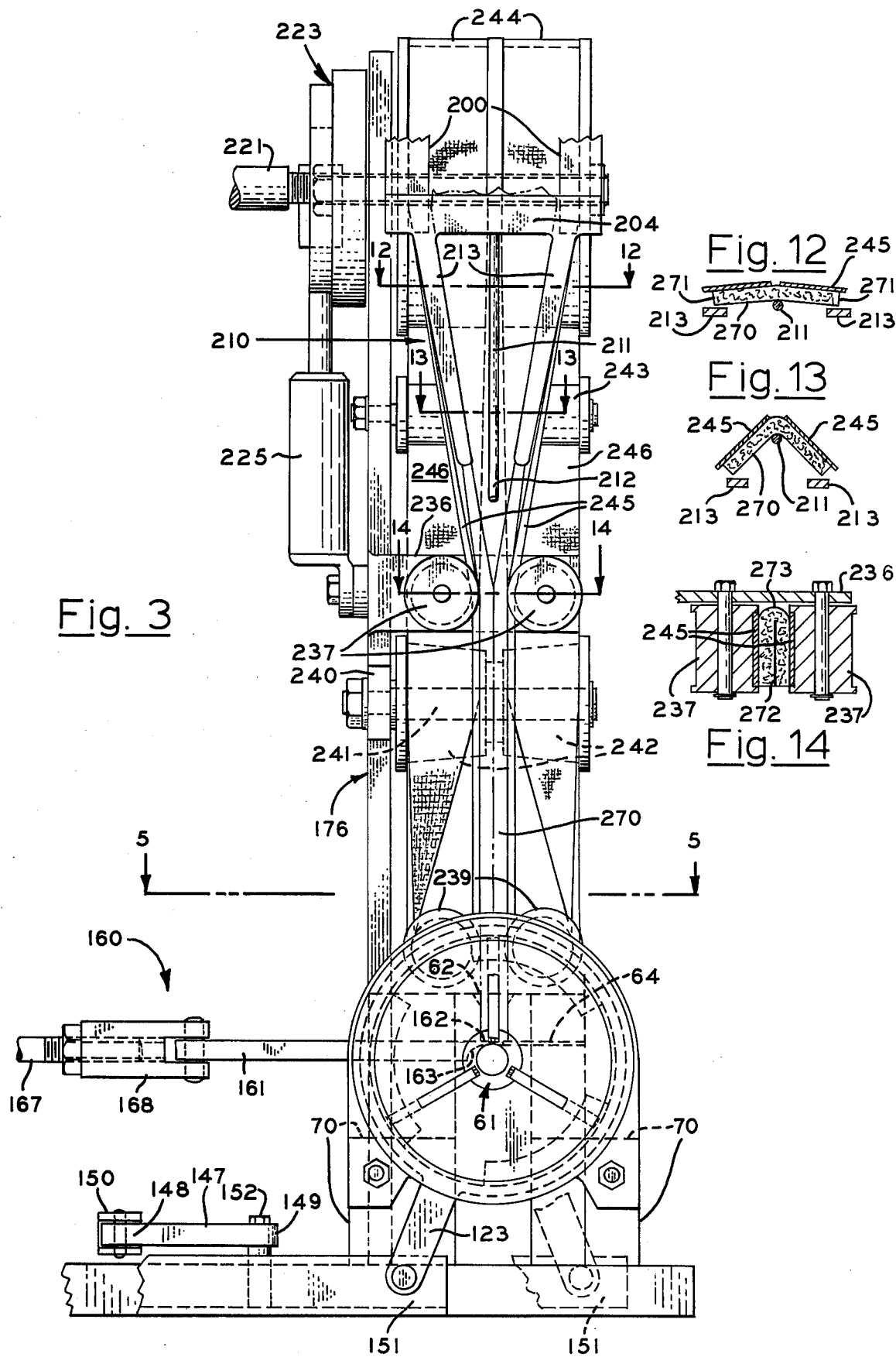

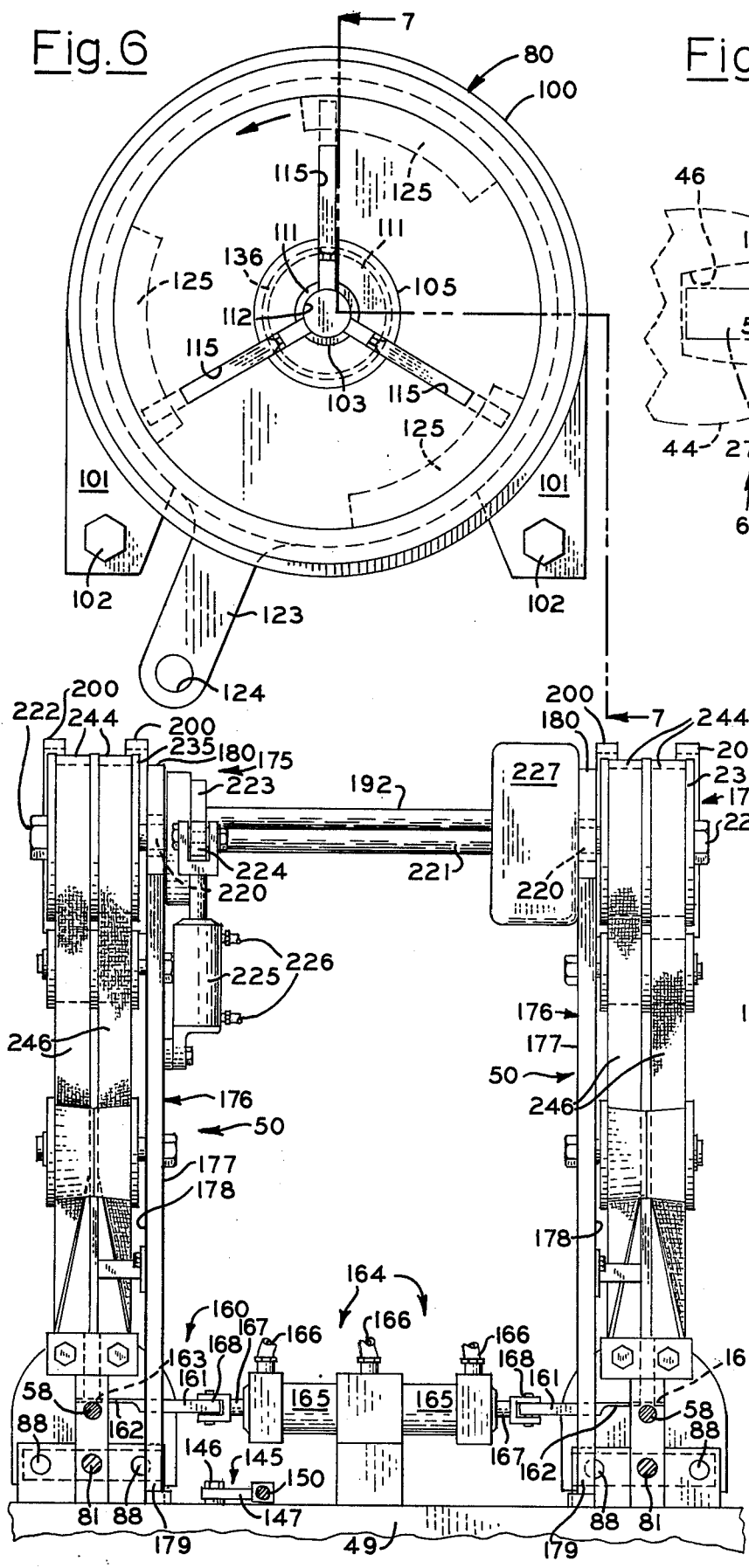

STUFFING APPARATUS

CROSS-REFERENCE TO RELATED APPLICATIONS

This application is co-pending with my U.S. Pat. application, Ser. No. 567,811 filed Apr. 15, 1975 entitled Machine To Remove Pits And Stuff Olives claiming priority of my Spanish patent application No. 431,436, filed Oct. 28, 1974. In partial respects, this application has subject matter in common with my said co-pending application and in such respects claims the priority thereof as a continuation-in-part.

BACKGROUND OF THE INVENTION

1. Field Of The Invention

The present invention relates to a stuffing apparatus and more particularly to such a stuffing apparatus which is particularly well suited to the stuffing of olives with pimento or other substances automatically, rapidly and with a precision and dependability never before achieved in the art.

2. Description Of The Prior Art

The prior art is replete with a multiplicity of devices related to the coring and/or stuffing of drupaceous fruit, such as olives. The prior art contains a plurality of machines utilizing the continuous traveling of objects during pitting and stuffing operations; the indexing of olives through pitting and stuffing stations; the use of cams to actuate pitters and stuffers in relation to olives borne in carriers; and the use of a pair of gripping members for olives to be processed.

The abundance of prior art devices for the same or similar purposes testifies to the magnitude of the effort heretofore directed to the provision of effective machines for pitting and stuffing olives and the like. There has been a continuous search for a more efficient, rapid, dependable and practical machine for stuffing objects such as olives and which is capable of producing a finished product having a pleasing appearance undamaged by mechanical manipulations and being of consistently high quality and marketable form. In many instances the deficiencies encountered in the use of prior art devices have prolonged the dependance of the industry upon manual labor in the stuffing of such objects. Because of the high cost of manual labor in the United States, this results in the reliance of the industry in the United States to a significant degree upon fruit stuffed in foreign countries where manual labor is less expensive.

Therefore, it has long been recognized that it would be desirable to have a stuffing apparatus for use in the stuffing of objects, such as olives, with a stuffing material on an automatic and very rapid basis and which efficiently and dependably produces finished products of consistently high quality unaffected by mechanical manipulations and possessing a completely pleasing marketable appearance.

SUMMARY OF THE INVENTION

Therefore, it is an object of the present invention to provide an improved stuffing apparatus for olives and the like.

Another object is to provide such an apparatus which operates dependably at high speeds.

Another object is to provide such an apparatus which operates individually to manipulate objects to be stuffed to dispose them in an attitude receptive to the receipt of stuffing material.

Another object is to provide such an apparatus which operates automatically, individually to insert material into objects in a continuous operation.

Another object is to provide such an apparatus which possesses particular utility in the stuffing of olives with pimento and other stuffing materials.

Another object is to provide such an apparatus which utilizes an elongated strip of stuffing material which is delivered to a slicing station and sliced into segments of the material immediately prior to the stuffing operation.

Another object is to provide such an apparatus which operates in increments of stepped progression to deliver a continuous strip of stuffing material to a slicing station, slice the material into segments, manipulate an olive in a stuffing station for receipt of the stuffing material and deposit the stuffing material into the cavity of the olive.

Another object is to provide such an apparatus which operates to form folded pimento segments which are subsequently inserted into each olive to form a stuffing olive with a substantially smooth exterior and a pleasing appearance.

Another object is to provide such an apparatus which operates to manipulate the olives and stuffing material during the stuffing operation without damage thereto.

A further object is to provide such an apparatus which can operate with a minimum of maintenance for extended periods of time without operational failure.

Other objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 3 is a transverse vertical section taken on line 3—3 in FIG. 1 and somewhat enlarged approximately to the actual size of the preferred embodiment of the apparatus.

FIG. 6 is a somewhat further enlarged front elevation of the dilator assembly.

FIG. 7 is a quarter section taken on line 7—7 in FIG. 6.

FIG. 8 is a fragmentary vertical section of the dilator assembly with a dilator finger thereof shown in a retracted position.

FIG. 9 is a rear elevation of the stuffing apparatus.

FIG. 12 is a horizontal section taken on line 12—12 in FIG. 3.

FIG. 13 is a horizontal section taken on line 13—13 in FIG. 3.

FIG. 14 is a horizontal section taken on line 14—14 in FIG. 3.

DESCRIPTION OF THE PREFERRED EMBODIMENT

Figure 1:
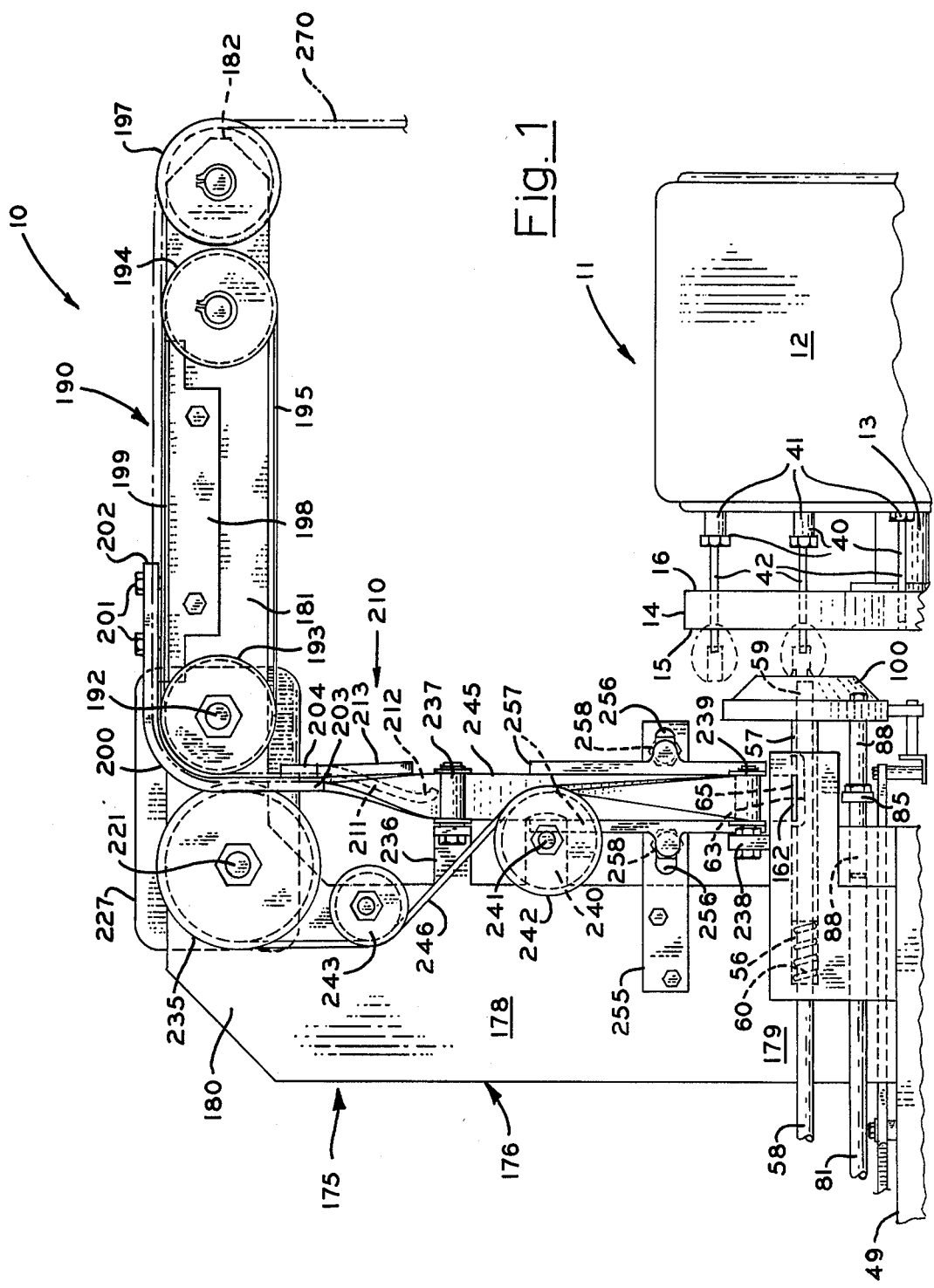
FIG. 1 is a fragmentary side elevation of the stuffing apparatus mounted in a typical operative environment on a machine adapted successively to remove the pits from olives and deliver them to a stuffing station.

Referring more particularly to the drawings, FIG. 1 shows the stuffing apparatus of the present invention generally indicated by the numeral 10. Although the stuffing apparatus has utility in the insertion of a variety of types of materials into a variety of types of objects, it will be described herein in what is believed to be its primary area of usage, that is, the stuffing of olives with pimento. The stuffing apparatus is adapted to be mounted on and operated as an integral part of a pitting machine 11. The pitting machine can be any one of a variety, such as the one disclosed in the Drake U.S. Patent No. 2,246,843 or in my above identified co-pending application. It will be understood that the specific type of pitting machine shown and described herein is not essential to the operation of the apparatus of the present invention, but that other types can also be employed. The portion of the pitting machine shown and described is disclosed merely for purposes of illustrating the co-action which exists between the pitting machine and the stuffing apparatus of the present invention.

The stuffing apparatus 10 of the preferred embodiment is constructed so as to stuff two olives simultaneously. Such a design has been found to be efficient and dependable in operation. However, it will be understood that the stuffing apparatus can be constructed so as to stuff one olive, or any number of olives simultaneously without departing from the scope of the invention.

The pitting machine 11 in the preferred embodiment of the device of the present invention, has a pair of control units 12 employed so as to permit the handling and stufffing of two olives simultaneously. Each control unit constitutes a portion of the pitting machine which interacts with the stuffing apparatus and performs the functions hereinafter to be described. Each control unit houses both a drive mechanism and a plurality of cams for sequencing the operation thereof. A drive shaft 13 is mounted on and extended from the control unit. The drive shaft is adapted to be rotated by the control unit in increments of stepped progression. An index wheel 14 is borne by the remote end of the drive shaft in spaced relation to the control unit. The index wheel has a front surface 15 and a rear surface 16.

The index wheel 14 operates in the pitting machine 11 as a carrier for the olives, or other objects, during the pitting operation. This pitting operation is normally performed on the lower portion of the wheel which is not shown in the drawings. The Drake U.S. Pat. No. 2,246,843 and the Francisco U.S. Pat. No. 2,681,089 disclose typical pitting operations using a wheel such as index wheel 14.

Figure 4:
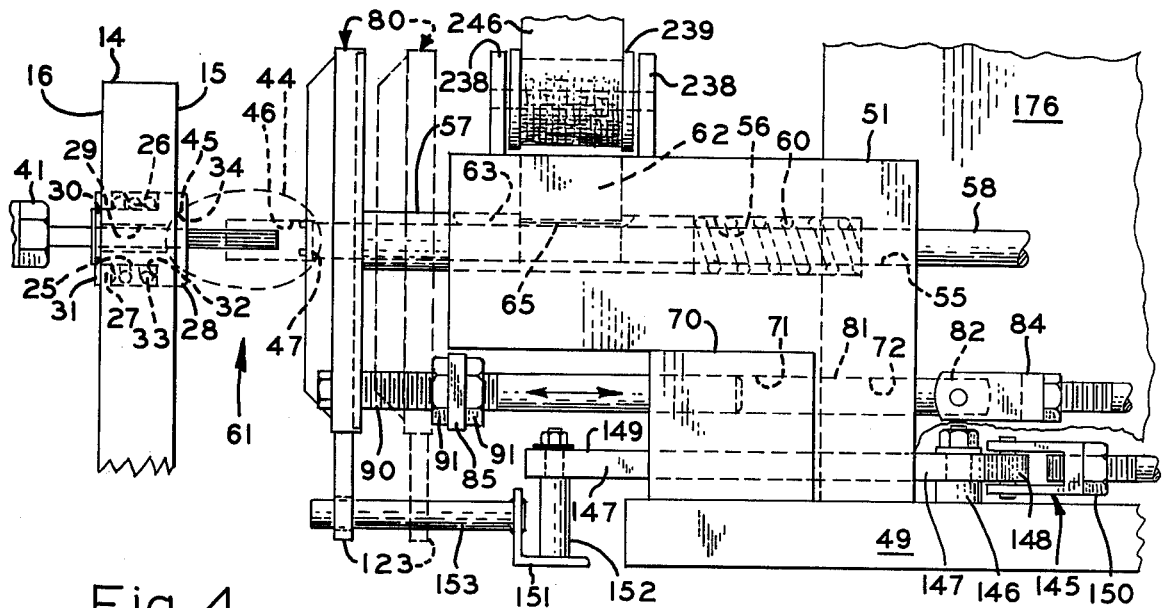
FIG. 4 is a fragmentary side elevation showing the feeding head and dilator assembly of the apparatus.
Figure 5:
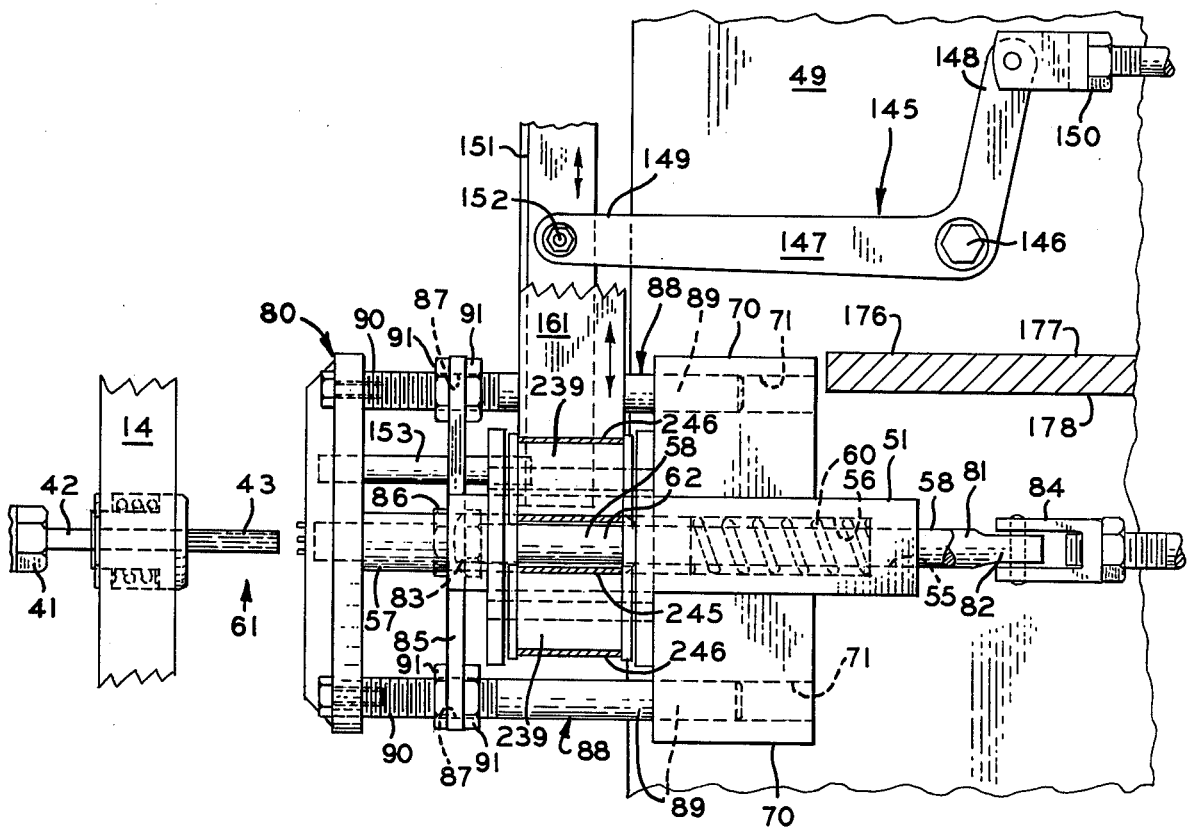
FIG. 5 is a fragmentary horizontal section taken from a position indicated by line 5—5 in FIG. 3.

The index wheel 14 has a plurality of passages 25 extended therethrough from the front surface 15 to the rear surface 16. The passages are arranged in spaced relation about the wheel adjacent to its periphery so as to be concentric to the axis of rotation of the drive shaft 13. As best shown in FIGS. 4 and 5, a cylindrical chamber 26 is formed in the index wheel concentric to the axis of each of the passages 25 extending inwardly from the front surface 15 of the wheel to a position adjacent to the rear surface 16 thereof to form an annular flange 27 between the chamber and the rear surface 16 of the wheel.

An adjustment member 28 is slidably received in each of the cylindrical chambers 26. Each adjustment member has an axial passage 29 extending therethrough which is coaxial with its respective passage 25. Each adjustment member has an annular groove 30 on the portion thereof nearest the rear surface 16 of the index wheel 14. A locking ring 31 is received in the annular groove 30 of each adjustment member so as to prevent movement of the adjustment member from the chamber to the right, as viewed in FIGS. 4 and 5. Each member has an annular interior shoulder 32 spaced from the flange 27. A compression spring 33 of substantial resiliency is extended about the member engaging the flange 27 at one end and the interior shoulder 32 at the other end thereof. Each compression spring thus resiliently retains its respective adjustment member in the position shown in FIGS. 4 and 5. Each member can be moved against spring pressure a limited distance to the left, as viewed in FIGS. 4 and 5. Each of the members 28 has a rounded recess 34 which is concentric to the axis of the axial passage 29 and is adjacent to and faces away from the front surface 15 of the index wheel.

Each control unit 12 and index wheel 14 mount a plurality of punch assemblies 40 which extend from the control unit through the index wheel 14, as best shown in FIG. 1. Each of the punch assemblies has a mount 41 which is extended outwardly from the control unit toward the index wheel. A punch 42 is borne by each mount and is extended through the axial passage 29 of its respective adjustment member 28. Each punch has a fluted portion 43 remote from the mount. Each of the punch assemblies is adapted to be endwardly moved, as operated by the control unit, in sequence between an extended position, in which the fluted portion of the punch is extended a predetermined distance outwardly from the front surface 15 of the index wheel, and a retracted position, in which the fluted portion of the punch is fully retracted with the adjustment member inwardly of the recess 34. As shown in FIG. 1, the upper two punch assemblies 40 are shown in their fully extended positions and the lowest punch assembly is shown in its fully retracted position.

For purposes of illustrative convenience, olives are indicated herein by numeral 44. Each olive has an end portion 45 and, after the removal of its pit, an internal cavity 46 communicating with the exterior thereof through a mouth 47.

It will be understood that in accordance with conventional practice and as disclosed, for example, in the Drake U.S. Pat. No. 2,246,843 and the Francisco U.S. Pat. No. 2,681,089, the pitting machine 11 operates, using the punch assemblies and other assemblies not shown, to remove the pit from each olive in sequence in what is termed a "coring" or "pitting" operation. This operation takes place on the lower portion of the wheel not shown in FIG. 1. Furthermore, the pitting operation includes as a part thereof the impaling of an olive 44 on the fluted portion 43 of each punch 42. Subsequent to pitting, each olive is transported on its respective punch with the wheel in movements of stepped progression which brings each olive in sequence to the position shown in FIG. 1 on the highest punch assembly.

The stuffing apparatus 10 has a base plate 49 which may simply be a portion of the pitting machine 11 or a structure individual to the stuffing apparatus. As previously noted, the stuffing apparatus in its preferred embodiment is adapted to handle and stuff two olives simultaneously. To this end, the apparatus has a pair of stuffing units 50 which are substantially identical except that one is a mirror image of the other and with a few other exceptions which will hereinafter be noted. Insofar as the stuffing units are identical, they will be described simultaneously.

Each stuffing unit 50 has a feeding head 51 which is mounted on the base plate 49 and has a forward portion 52 extending toward the control unit 12 of the pitting machine 11 in precise alignment with and in predetermined spaced relation to the fluted portion 43 of a punch assembly 40 in the position represented by the middle punch assembly in FIG. 1. The feeding head has a rearward portion 53 and an upper surface 54. A passage 55 is extended longitudinally through the feeding head extending outwardly through both the forward and rearward portions thereof. A cylindrical chamber 56 extends from the forward portion 52 of the feeding head internally of the feeding head in coaxial relation with the passage 55 to a point adjacent to the rearward portion 53 of the feeding head, as best shown in dashed lines in FIG. 1. A sleeve 57 is slidably received in the cylindrical chamber 56. The interior of the sleeve is of the same diameter as the passage 55 and thus, in effect, constitutes part of the passage 55. A plunger 58 is extended through the passage 55 of the feeding head and through the sleeve 57 thereof and has a stuffing end portion 59. A compression spring 60 is extended about the plunger between the end of the cylindrical chamber 56 and the sleeve 57 to urge the sleeve outwardly from the feeding head. As can be seen in FIGS. 1, 4 and 5, the area between the forward portion of the feeding head and the punch 42 of the index wheel 14 which is in alignment with the plunger 58 constitutes an inserting or stuffing station 61 for that stuffing unit 50.

The feeding head 51 has a slot 62 extending, in a predetermined position, from the upper surface 54 of the feeding head to the passage 55. The sleeve 57 has an opening 63 therein which communicates with the slot 62 and is elongated laterally thereof so that communication with the slot is maintained regardless of the position of the sleeve 57 in the passage 55 during normal operation of the stuffing apparatus 10. A slot 64 is extended horizontally through the forward portion 52 of each feeding head 51 substantially tangentially to the passage 55 and communicating with the opening 63 of the sleeve, as can best be seen in FIGS. 2, 3 and 4. The space within the passage 55 with which the slot 62, opening 63 and slot 64 communicate constitutes a loading or slicing station 65 for that respective stuffing unit.

The feeding head 51 of each stuffing unit 50 has a pair of guide blocks 70 mounted on the base plate 49 and integral with the feeding head on opposite sides thereof, as shown in FIGS. 1 through 5. Each of the guide blocks has a guide passage 71 extending therethrough substantially parallel to the passage 55 of the feeding head. A central passage 72 extends through the feeding head between the guide passages 71 and beneath the passage 55. Thus, the passages 55, 71 and 72 are substantially parallel to each other.

Each stuffing unit 50 of the stuffing apparatus 10 has a dilator assembly 80 which can best be seen in FIGS. 4 through 8. The dilator assembly has a drive arm 81 slidably received in the central passage 72 of the feeding head. The drive arm has a link end 82 adjacent to the rearward portion 53 of the feeding head and an opposite screwthreaded end portion 83. A linkage 84 interconnects the link end 82 of the drive arm with a suitable means for driving the arm such as a hydraulic cylinder, not shown. A cross bar 85 is received on the screwthreaded end portion 83 of the drive arm substantially normal thereto and is held in position on the arm by a nut 86 screwthreadably secured on the end portion 83. The cross bar has a pair of holes 87 individually extended therethrough adjacent to the opposite ends of the cross bar and in individual axial alignment with the guide passages 71 of the guide blocks 70. A guide bar 88 is extended through each of the holes 87 of the cross bar 85. Each guide bar has a slide portion 89 which is slidably received in the guide passage 71 of its respective guide block 70 and an opposite screwthreaded portion 90. The guide bars are united with the cross bars in predetermined positions or the screwthreaded portions 90 of the guide bars by a pair of nuts 91 which are screwthreadably secured on the screwthreaded portions to lock the cross bar in position therebetween.

The dilator assembly has a dilator head 100 having a pair of flange plates 101 which can best be seen in FIG. 6. A pair of bolts 102 individually extend through the flange plates 101 to mount the dilator head 100 in upright position on the screwthreaded portions 90 of the guide bars 88, as can best be seen in FIG. 4. The bolts 102 are individually screwthreadably secured in the ends of the screwthreaded portions 90. The dilator head has a front opening 103 of predetermined diameter and a rear opening 104 each of which is of substantially larger circular configuration than the front opening. The dilator head has a recess 105 therein which is substantially concentric to the front opening and which faces the stuffing stations 61. The dilator head has a circular race 106 extending into the head from the rear opening 104. A back plate 107 is secured by suitable bolts 108 on the dilator head in covering relation to the rear opening and circular race of the dilator head. The back plate has a central passage 109. A mount 110 is fastened on the back plate substantially centrally thereof and in axial alignment with the central passage 109 of the back plate. The mount has a cylindrical projection 111 extending therefrom through the front opening 103 and outwardly from the dilator head, as best shown in FIGS. 6, 7 and 8. A central passage 112 extends from the central passage 109 of the back plate out through the projection 111. The central passage 112 is of a diameter permitting the plunger 58 to pass therethrough. An annular groove 113 is formed about the mount between the projection and the back plate. Three slots 114 are formed in the mount and projection thereof, as best shown in FIGS. 7 and 8. The slots are spaced from each other about the central passage 112 preferably 120° apart. Three slots 115 are formed in the dilator head in individual coplanar relation with the slots 114 and communicating with the central passage 112 of the mount 110 and projection 111.

The dilator head 100 has a control ring 120 therein. The control ring has an exterior surface 121 and an interior surface 122. The control ring is slidably received within the circular race 106 of the dilator head for rotational movement about the axis of the central passage 112 of the mount 110. A lever arm 123 is mounted on the exterior surface of the control ring extending downwardly between the flange plates 101, as best shown in FIG. 6. The lever arm has a hole 124 therein. Three guide plates 125 are mounted on the interior surface 122 of the control ring spaced approximately 120 degrees apart, as best shown in FIGS. 6 through 8. Each guide plate extends from a position adjacent to the back plate 107 to a position spaced farther from the back plate. Each guide plate is slightly twisted or warped longitudinally thereof, as best shown in FIGS. 6 and 7, so as to define a path of travel as will hereinafter be described.

The dilator head 100 mounts three dilator fingers 130. Each finger has a tapered, extended portion 131, a central or elbow portion 132 and a guide portion 133. The guide portion has a slot 134 therein adapted to be fitted slidably about a guide plate 125, as best shown in FIGS. 6 and 7. A hole 135 is provided in the elbow portion 132 of each finger. Each finger is received in one of the slots 114 of the mount and projection. A lock ring 136 is extended through the hole 135 of each finger to lock the dilator fingers pivotally in position on the mount. Each finger is, thus, pivotally mounted on the mount for movement in its respective slots 114 and 115 between the positions of the fingers shown in FIGS. 7 and 8. Similarly, the guide portion 133 of each finger slidably engages its respective guide plate. Thus, it will be seen that movement of the lever arm 123 causes the extended portions 131 of the dilator fingers to be moved between the retracted position shown in FIG. 8 and the extended position shown in FIG. 7. The control rings 120, lever arms 123 and guide plates 125 of the two dilator heads of the stuffing apparatus are arranged identically so that movement of the lever arms to the right, as viewed in FIG. 3, causes the extended portions 131 of the dilator fingers to be retracted and, conversely, movement to the left causes the extended portions to be expanded.

The stuffing apparatus 10 has a dilator actuator assembly 145 which is connected to and operates the dilator assemblies 80 of the stuffing units 50. The actuator assembly has a pivot mount 146 affixed in upright relation on the base plate 49, as best shown in FIGS. 4 and 5. A lever arm 147 is pivotally mounted on the pivot mount 146 and has a first end portion 148 and an opposte second end portion 149. A drive linkage 150 is connected to the first end portion 148 of the lever arm and connected at its opposite end to a suitable driving means such as a hydraulic cylinder, not shown. An actuator bar 151 is borne by the second end portion 149 of the lever arm connected thereto by pivotal connection 152. A pair of control shafts 153 are individually secured on the actuator bar adjacent to its opposite ends and the shafts have remote ends extended through the holes 124 of the lever arms 123 of the control rings 120. Movement of the lever arm 147 through the drive linkage 150 permits operation of the control rings 120 of the dilator heads through the slidable interconnection of the lever arms 123 and the control shafts 153. Accordingly, movement of the actuator bar and thus the lever arms 123 connected thereto toward the right as viewed in FIG. 3 causes the extended portions 131 of the dilator fingers 130 to be moved toward each other to retracted positions as shown in FIG. 8. Conversely, movement of the actuator bar to the left, as viewed in FIG. 3, moves the dilator fingers to the expanded positions shown in FIG. 7.

As can best be seen in FIG. 4, the dilator head 100 can be moved by the drive arm 81 between a retracted position, such as shown in dashed lines in FIG. 4, and an extended position shown in full lines in FIG. 4 for purposes subsequently to be described. Such movement of the dilator head is accommodated by slidable movement of the lever arm 123 along the control shaft 153 of the dilator actuator assembly 145 as permitted by the hole 124. Similarly, the compression spring 60 maintains the sleeve 57 in engagement with the back plate 107 of the dilator head.

The stuffing apparatus 10 has a slicing or severing assembly 160. The severing assembly has a pair of severing members 161, each having a cutting blade 162 at the end thereof, individually slidably received in the slot 64 of the feeding head 51 of each for slidable movement therewithin to and from the slicing station 65. The cutting blade of each severing member is formed so as to have a downardly facing recess 163, as can best be seen in FIGS. 3 and 9. Each cutting blade is movable to a position in which it is tangential to the passage 55 of its respective feeding head 51 intersecting the slot 62 and passing through the opening 63 of the sleeve 57.

The severing assembly 160 has a hydraulic drive assembly 164 mounted on the base plate 49 between the feeding heads 51 of the stuffing units 50. The hydraulic drive assembly has a pair of co-acting hydraulic cylinders 165 operated through hydraulic lines 166 in the conventional manner. Each hydraulic cylinder has a thrust arm 167 extended therefrom and connected at its outer end to the severing member 161 by a linkage 168. It will be seen that the cutting blades 162 are retractable by the hydraulic drive assembly 164 to positions in which they are fully withdrawn from the sleeves 57 within their slots 64 thereby permitting the slots 62 to communicate fully with the slicing stations of the feeding heads. Conversely, the cutting blades are movable by the hydraulic drive assembly to positions in which the cutting blades intersect the slots 62 and overlay in tangential relation the passages 55 of the feeding heads. Thus, in these latter positions the plungers 58 can pass along their respective passages 55 under the cutting blades.

Each stuffing unit 50 has a pimento feeding mechanism 175. Each pimento feeding mechanism has an upright frame wall 176 mounted on the base plate 49. The frame wall has an inner surface 177 facing the hydraulic drive assembly 164 of the severing assembly 160 and an opposite outer surface 178. The frame wall has a lower portion 179 and an upper portion 180. The frame wall has an integral laterally extending portion 181 which extends to a remote end 182, as best shown in FIG. 1.

Figure 2:
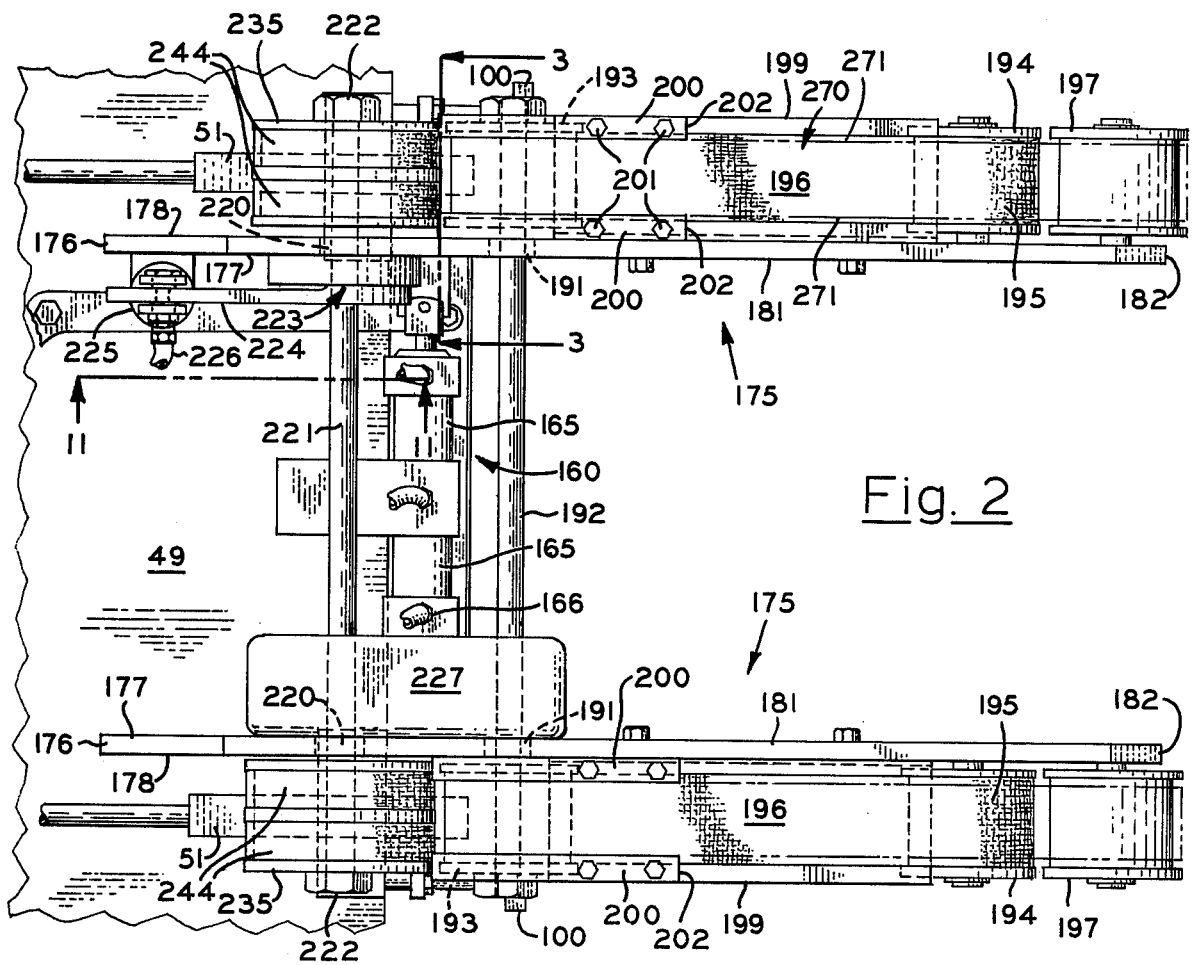
FIG. 2 is a top plan view of the stuffing apparatus of the present invention.
Figure 10:
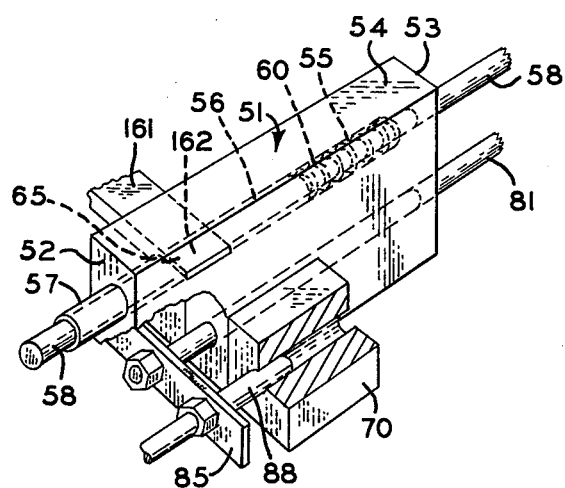
FIG. 10 is a diagrammatic perspective view of a portion of the apparatus showing the spacial relationship of the shafts and linkages thereof.

A first conveyor assembly 190 is mounted on the laterally extending portion 181 of each frame wall 176 on the outer surface 178 thereof. Each conveyor assembly has a bearing 191 mounted in predetermined position on the laterally extending portion 181 of its respective frame wall. The bearings of the conveyor assemblies are aligned transversely of the frame walls defining an axis of rotation substantially normal to the frame walls. A driven shaft 192 is rotationally received in the bearings 191 extending therethrough outwardly of the outer surfaces 178 of the frame walls. Each first conveyor assembly has a driven roller 193 secured on its respective end of the driven shaft adjacent to the outer surface 178 of the frame wall for rotation with the driven shaft. An idler roller assembly 194 is rotationally mounted on the outer surface 178 of the frame wall in predetermined spaced relation to the remote end 182 of the laterally extending portion, as best shown in FIGS. 1 and 2. A conveyor belt 195 is operably extended about the driven roller and idler roller assembly 193 and 194 respectively. The conveyor belt has an upper run 196 which, during operation of the first conveyor assembly, is driven to the left, as viewed in FIGS. 1 and 2, upon rotation of the driven shaft 192 and the resultant rotation of the driven rollers 193.

An outer idler roller assembly 197 is secured for rotational movement on the laterally extending portion 181 of each frame wall immediately adjacent to the remote end 182 thereof in side-by-side relation to the idler roller assembly 194. A mounting plate 198 is affixed on the laterally extending portion 181 of each frame wall 176 on the outer surface 178 thereof. A support platform 199 is borne by the mounting plate extending substantially horizontally under the upper run 196 of the conveyor belt 195 between its respective driven roller 193 and idler roller assembly 194. Thus, the upper run 196 of the conveyor belt is rested upon the support platform 199.

As can best be seen in FIGS. 1 and 2, a pair of guide plates 200 are fastened on the support platform 199 of each first conveyor assembly 190. The guide plates are mounted in position by spacer assemblies 201 which dispose the guide plates in elevated relation above the support platform 199 and slightly overlapping the lateral edges of the upper run 196 of the conveyor belt 195. The guide plates have entrance portions 202 disposed above the support platform and the guide plates are curved around, in closely spaced relation, a portion of the circumference of their respective driven roller 193 to downwardly extending exit end portions 203 above the slot 62 in their respective feeding head 51. A cross plate 204 is fastened on the exit end portions 203 of the guide plates in substantially right-angular relation thereto so as to interconnect the guide plates.

Each pimento feeding mechanism 175 has a pimento folding mechanism 210. The folding mechanism has a folding mandrel finger or rod 211 which is affixed on the cross plate 204 substantially midway between the guide plates 200. The folding rod extends obliquely from the cross plate to a remote end 212 in substantially precise vertical alignment with the slot 62 of the feeding head 51, as best shown in FIG. 1. A pair of guide fingers 213 are borne by the cross plate in spaced relation to the folding finger and extending downwardly from the cross plate, as best shown in FIGS. 1 and 3.

Figure 11:
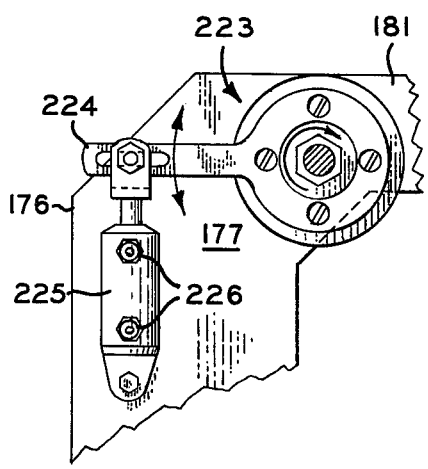
FIG. 11 is a vertical section taken on line 11—11 in FIG. 2.

Each folding mechanism 210 has a bearing 220 mounted on the upper portion 180 of its respective frame wall 176. The bearings of the folding mechanism define an axis of rotation extending substantially normal to the frame walls. A drive shaft 221 is rotationally received in the bearings 220 and has opposite ends 222 individually extending predetermined distances laterally of the outer surfaces 178 of the frame walls 176, as can best be seen in FIG. 2. A clutch assembly 223 is mounted on the drive shaft 221 adjacent to the frame wall 176 on the left as viewed in FIG. 9. A lever arm 224 is borne by the clutch assembly. A hydraulic cylinder 225 operated through hydraulic lines 226 connected thereto is secured on the inner surface 177 of the frame wall 176 on the left, as viewed in FIG. 9 and is operably connected to the lever arm 224. The clutch assembly 223 may be of any suitable type such as a cam type clutch. The clutch assembly is operated to rotate the drive shaft 221 in increments of stepped progression through controlled reciprocation of the lever arm 224. Thus, in a clutch assembly of this type, movement of the lever arm in an upward direction, as viewed in FIG. 11 causes the drive shaft 221 to be rotated by the clutch assembly in a clockwise direction a predetermined number of degrees which are equal to the number of degrees of upward movement of the lever arm. Conversely, downward movement of the lever arm causes the clutch to "free wheel" about the shaft thereby allowing it to remain stationary. Thus, reciprocation of the lever arm causes rotation of the drive shaft 221 in increments of stepped progression.

A gear box 227 is mounted on the inner surface 177 of the frame wall 176 on the right as viewed in FIG. 9. The gear box operably interconnects the drive shaft 221 and the driven shaft 192. The gear box can be of any suitable type containing gears operable to transmit rotation in a counterclockwise direction, as viewed in FIG. 1, to the driven shaft 192. The gears are selected to equalize the linear speed of the conveyor belts 195 and the conveyor belts hereinafter to be described upon rotation of the drive shaft 221 by the clutch assembly 223.

Each feeding mechanism 175 has a drive roller assembly 235 mounted on the drive shaft 221 adjacent to its respective opposite end 222. A bracket 236 is affixed on each frame wall 176 adjacent to the remote end 212 of the folding finger 211. A pair of folding roller assemblies 237 are rotationally mounted in side-by-side relation on the bracket 236 immediately below the remote end 212 of the folding finger and in substantial vertical alignment with the slot 62 of the feeding head 51. A mount 238 is borne by each feeding head rearwardly adjacent to the slot 62 thereof. A pair of idler roller assemblies 239 are rotationally secured on the mount 238 in individual vertical alignment with the folding roller assemblies 237 thereabove. A bracket 240 is fastened on each frame wall 176 below the bracket 236. A shaft 241 is borne by the bracket and extends substantially normal thereto. A pair of beveled rollers 242 are rotationally mounted on the shaft 241. An idler roller 243 is rotationally mounted on each frame wall 176 below its respective drive roller assembly 235.

As shown in FIG. 1, a pair of endless conveyor belts 244 are extended in side-by-side relation about the drive roller assembly of each folding mechanism 210, between the pair of folding roller assemblies 237 and on opposite sides of the folding rod 211, about the pair of idler roller assemblies 239, upwardly over the pair of beveled rollers 242, about the idler roller 243 and about the drive roller assembly to complete the circular conveyor belts. The conveyor belts have folding runs 245 extending from their respective drive roller assembly downwardly between the pair of folding roller assemblies 237 and about the idler roller assemblies 239. The belts have return runs 246 extending generally upwardly from the idler roller assemblies 239 over the beveled rollers 242 about the idler roller 243 and to the drive roller assembly 235.

A mounting bracket 255 is secured on the lower portion 179 of the frame wall 176 extending outwardly therefrom laterally of the folding runs 245 of the conveyor belts 244, as best shown in FIG. 1. The mounting bracket has a pair of slots 256 therein. A pair of pimento guides 257 are individually adjustably fastened on the mounting bracket by bolt and nut assemblies 258 which extend through the slots 256. The pimento guides are borne by the mounting bracket in adjustable spaced relation on opposite sides of the space between the folding runs of the belts to insure that, as will be described, the pimento is retained between the folding runs of the belts during transport by the belts.

As shown in FIG. 1, each stuffing unit 50 of the stuffing apparatus 10 is adapted to utilize a pimento ribbon or strip 270. The strip is formed from pimento which is ground and then intermixed with a suitable edible binder, such as gelatin. The mixture is then shaped into a long narrow strip of slight thickness and permitted to set until the binder congeals sufficiently to retain the mixture in its strip configuration. The precise length, width and thickness of the strip is not critical to its use since the strip, so formed, has an elastic character which permits it to be compressed or expanded during operation of the apparatus. However, the preferred width is approximately 1.25 inches and the preferred thickness is approximately 0.25 inches. The length can be whatever is convenient for the operator.

Each pimento strip 270 has lateral edge portions or edges 271 and is transported through its respective stuffing unit 50 to form a folded portion 272 having a back portion 273. During operation of each stuffing unit, as will hereinafter be described, the pimento strip is successively severed to form a plurality of pimento segments 274. It has been discovered that the use of such an elongated strip of stuffing material facilitates the handling of the stuffing material with a minimization of the structure required for such handling and a considerably increased dependability of operation.

OPERATION

Operation of the described embodiment of the subject invention is believed to be clearly apparent and is briefly summarized at this point. As previously noted the stuffing apparatus 10 of the present invention is preferably mounted on a pitting machine 11 which can be of any suitable type, for example, as shown in the Francisco U.S. Pat. No. 2,681,089 or the Drake U.S. Pat. No. 2,246,843. Similarly, the mechanisms of the pitting machine for indexing the various operations of the pitting machine 11 and stuffing apparatus 10 can be of any suitable type capable of advancing the pimento strip 270 through the folding, slicing and stuffing operations and sequencing operation of the dilator assembly 80. These operations, hereinafter to be described, are performed in increments of stepped progression whereby each olive 44 borne by a punch 42 of the pitting machine 11, is sequentially dilated and stuffed in the stuffing station 61. These operations are preferably performed in a cycle during which one olive is pitted, another olive is stuffed, as will be described, and the pimento strip is advanced one increment of stepped progression. The mechanisms by which this sequency is accomplished are conventional in nature and constitute no part of the present invention.

Each stuffing unit 50 of the stuffing apparatus 10 is loaded by the placing of one of the pimento strips 270 on the first conveyor assembly 190 of that stuffing unit. Each strip is rested on the upper run 196 of the conveyor belt 195 and extended over the outer idler roller assembly 197, as shown in FIG. 1. It has been found helpful to wet each pimento strip in advance so that it is resilient and partially adheres to the upper run of the conveyor belt. The strips of the stuffing units are preferably positioned in corresponding positions on the conveyor assemblies 190 so that they are advanced during operation of the stuffing apparatus through corresponding positions simultaneously.

Subsequently, the pitting machine 11 is operated whereby the control unit 12 of the pitting machine and the corresponding control mechanism of the pitting machine for the stuffing apparatus insure that the pitting machine and stuffing apparatus perform their various operations in coordinated sequence. While the pitting machine is sequentially pitting the olives 44 and transporting them individually in increments of stepped progression to the stuffing station 61, the hydraulic cylinder 225 operates the clutch assembly 223 to rotate the drive shaft 221 and driven shaft 192 through the gear box 227. Each time the hydraulic cylinder 225 is operated to move the lever arm 224 in a clockwise direction, as viewed in FIG. 1, the conveyor belt 195 is moved in a counterclockwise direction and the belts 244 are moved in a clockwise direction as viewed in FIG. 1. Thus, repeated operation of the clutch assembly transports each pimento strip 270 along its respective first conveyor assembly, between the guide plates 200 and downwardly against the conveyor belts 244.

The continued movement of each strip 270 in increments of stepped progression carries each strip under the cross plate 204 of its respective stuffing unit 50 and into engagement with the folding finger 211. The finger engages the center of the pimento strip and forces the center gradually toward the left, as viewed in FIG. 1, during repeated movement of the strip against the finger. Simultanously, the folding runs 245 of the conveyor belts 244 are simultaneously diverted from a substantially coplanar configuration into spaced, facing juxtaposition by the folding roller assemblies 237. This cooperative action of the folding finger 211 and folding runs 245 of the conveyor belts 244 acts to fold the pimento strip longitudinally thereof so as to form the folded portion 272 which, during normal operation of the stuffing apparatus extends from the pair of folding roller assemblies 237 into the slicing station 65 of the feeding head 51. This cooperative action of the folding finger and folding runs is illustrated in FIGS. 12, 13 and 14.

Movement of the pimento strip 270 of each stuffing unit 50 is continued during operation of the pitting machine and stuffing apparatus and the leading end of the folded portion of the strip is soon fully received within the slicing station. Since operation of the pitting machine and stuffing apparatus is performed in a cycle which includes advancement of the pimento strip, pitting of one olive and stuffing of another olive which was previously pitted, advancement of the pimento strip into the slicing station is necessary before all of the operations of a complete cycle can be performed. The operator may prefer manually to advance the leading end of the strip into the slicing station prior to operation of the pitting machine and stuffing apparatus.

When the leading end of the folded portion 272 of the pimento strip 270 if fully received within the slicing station 65, the severing assembly 160 is operated. The co-acting hydraulic cylinders 165 force the severing members 161 along their respective slots 64. Thus, the cutting blades 162 sever the leading end of the pimento strip to form a pimento segment 274 within the slicing station. Preferably the blade of the severing assembly 160 remains in position extending above the slicing station so as to seal the slot 62 of the feeding head 51.

Immediately subsequent to the delivery of an olive 44 which has been pitted to the stuffing station 61 on its respective punch 42, as shown in FIG. 4, the dilator assembly 80 is operated. The drive arm 81 is moved in the direction of the stuffing station thereby carrying the dilator head 100 from the retracted position shown in dashed lines in FIG. 4 to the extended position shown in full lines in FIG. 4. Since, in this configuration, the dilator fingers 130 are in the retracted position such as shown in FIG. 7, the cylindrical projection 111 and extended portions 131 of the dilator fingers 134 easily enter the mouth 47 of the olive 44 and the cavity 46 thereof. With the dilator head in the fully extended position, the olive 44 is received in the recess 105. Thus, the olive is captured between the recess 34 of the adjustment member 28 and the recess 105. Slidable movement of the adjustment member 28 against the compression spring 33 allows olives of different lengths to be accommodated.

Subsequently, the dilator actuator assembly 145 is operated to move the actuator bar 151 and control shafts 153 of the stuffing units 50 to the left as viewed in FIG. 3. This causes the dilator fingers 130 to move the extended portions 131 of the dilator fingers from each other, as previously described and shown in FIG. 7. In so doing, the fingers open wider or "dilate" the mouth 47 of each olive 44 in the stuffing stations of the apparatus.

Thereafter, the plunger 58 of each stuffing unit 50 is moved to the right, as viewed in FIG. 1, so that the stuffing end portion 59 contacts the pimento segment 274 in the slicing station 65 and transports it through the sleeve 57, and central passage 112 of the mount 110 and projection 111 and into the cavity 46 of the olive 44 through its dilated mouth 47. As can best be visualized in FIG. 7, the orientation of the pimento segment is such that the back portion 273 of the segment constitutes the outer portion of the segment within the cavity of the olive. Thus, the stuffed olive has a pleasing and marketable appearance in that the visible portion of the pimento segment within the cavity has a smooth rounded surface.

Simultaneous with the movement of the plunger 58 toward the olive, the punch 42 of that olive is retracted to the position of the lowermost punch in FIG. 1 thereby leaving the cavity 46 of the olive free for the receipt of the pimento segment 274.

The actuator bar 151 is then motivated to the right as viewed in FIG. 3 to again return the dilator fingers to the retracted positions shown in FIG. 8. This permits the mouth 47 of the olive to return to its normal diameter and captures the pimento segment within the cavity. Subsequently, the dilator head 100 is retracted by movement of the drive arm 81 to the left, as viewed in FIG. 1, to carry the dilator head to the retracted position. Retraction of the dilator head 100 causes the sleeve 57 in engagement therewith to be pushed against the compression spring 60 and transported to a retracted position. Substantially simultaneously, the plunger 58 is retracted to the left, as viewed in FIG. 1, so as to carry the stuffing end portion 59 thereof to the left of the slicing station 65. This leaves the slicing station free for the receipt of the strip for severing in the next cycle of operation. The foregoing operation constitutes one cycle of operation of the stuffing apparatus in stuffing one olive in each stuffing unit 50 of the apparatus simultaneously. It will be understood that this cycle is performed extremely rapidly. In practice, one cycle is performed in a time interval of less than one second.

Upon the stuffing of the olive in the stuffing station 61 and retraction of the dilator head 100, the olive is thereby released by the apparatus and is permitted gravitationally to fall for collection by any suitable structure such as a conveyor or sloped trough for transport of the olives to another location for further processing.

The stuffing apparatus of the present invention permits the stuffing of objects such as olives with stuffing material on a fully automatic, extremely rapid, efficient and dependable basis so as to produce finished products of consistently high character, possessing high market value and being undamaged by mechanical manipulations.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. In a machine for inserting stuffing material into objects, each of which has a cavity communicating with the exterior thereof through a mouth, wherein the machine has a stuffing station and is adapted to deliver said objects successively to the stuffing station with the mouths disposed in a common direction, the improvement comprising a dilating mechanism having a plurality of fingers movable to and from said cavities substantially equally spaced about an axis aligned with the stuffing station movable toward said axis to contracted positions adapted to be received by the cavities of successive objects positioned at the stuffing station and from said axis to dilate the cavities and defining a passage therebetween along said axis; means for inserting said stuffing material through the mouths and into the cavities of objects at the stuffing station; and means operable while each object is at the stuffing station for successively moving the fingers toward the axis to constrict the fingers about the passage, inserting the fingers along the axis into the cavity of an object disposed at the stuffing station, spreading the fingers from the axis to dilate the cavity, inserting stuffing material through the passage into the cavity, retracting the fingers to retracted positions, and withdrawing the fingers from the cavity along said axis.

2. An improvement in a machine for individually, successively inserting material into objects each of which has a cavity dimensioned for the tight retention of a segment of said material when inserted therein and wherein the machine has an inserting station and an assembly for the sequential delivery of the objects into the inserting station with the cavities thereof disposed in a predetermined attitude, the improvement comprising a dilating mechanism having a plurality of fingers movable concurrently to and from said cavities and substantially equally spaced about the axis aligned with the inserting station and being relatively movable between contracted positions in which the fingers are receivable by the cavities and expanded positions adapted to dilate said cavities; a material feeding head mounted on the machine in substantial alignment with the cavities of such objects in said predetermined attitude; a slicing assembly; means for delivering said material to the slicing assembly in an elongated strip for successive slicing of the strip into segments; means for feeding each segment from the slicing assembly through the feeding head and into the cavities of successive objects in the inserting station; and sequencing means for successively inserting the fingers in contracted positions into the cavities of objects delivered to the inserting station, dilating the cavities by moving the fingers to expanded positions therein, feeding the segments into the cavities while dilated, contracting the fingers with the segments in the cavities, and withdrawing the fingers from the cavities with the segments retained therein.

3. The stuffing apparatus of claim 2 wherein dilating means are mounted on the stuffing machine between the slicing station and the stuffing station for movement into engagement with an olive in the stuffing station to dilate the entrance opening thereof prior to forcing of said segment therethrough.

4. In an olive stuffing machine having a stuffing station and means for delivering olives, each of which has been cored to form a cavity therein with an entrance opening, to the stuffing station with each of said olives oriented to present the opening thereof in a predetermined attitude, a stuffing apparatus comprising means for delivering a strip of stuffing material to a slicing station in juxtaposition to the stuffing station; slicing means for severing the strip in said slicing station to form a segment of the stuffing material; and plunger means for engaging the segment in the slicing station and forcing the segment therefrom into the stuffing station and through the opening of the olive into the cavity thereof wherein dilating means are mounted on the stuffing machine between the slicing station and the stuffing station for movement into engagement with an olive in the stuffing station to dilate the entrance opening thereof prior to forcing of said segment therethrough and wherein the dilating means has a plurality of fingers substantially equally spaced about an axis aligned with the stuffing station and pivotal toward each other for insertion into the entrance opening of an olive and from each other to dilate said opening immediately prior to said forcing of the segment through the opening and into the cavity of the olive.

5. The stuffing apparatus of claim 4 including a housing having a passage extending therethrough in alignment with the opening of an olive received in the stuffing station and the plunger means includes a plunger, having an end portion, slidably received in the passage of the housing for movement between a retracted position and an extended position in which the end portion of the plunger is disposed at the entrance opening of an olive in the stuffing station.

6. The stuffing apparatus of claim 5 wherein the housing has a second passage which joins the first passage of the housing between the retracted and extended positions of the plunger to form said slicing station and the delivering means transports the strip of stuffing material into the first passage through the second passage.

7. The stuffing apparatus of claim 6 wherein the slicing means includes a cutting blade received for movement in the housing between a retracted position and an extended position in which the blade is substantially tangential to the first passage at the juncture of the first and second passages in severing relation to said strip to form a segment thereof fully received in the slicing station.

8. The stuffing apparatus of claim 7 including means coacting with said delivering means for folding the strip of stuffing material prior to transport of said strip into the second passage of the housing.

9. The stuffing apparatus of claim 8 wherein the delivering means includes a first conveyor assembly operable to deliver the strip of stuffing material in increments of stepped progression into and along the second passage of the housing and into the slicing station and the folding means includes a pair of belts having folding runs extending from first positions in which said folding runs are substantially coplanar to second positions in which the folding runs are disposed in facing spaced relation and the folding means further includes a rod juxtaposed to the strip and engaged thereby between the first positions of the belts and said second positions thereof and the rod is shaped to coact with the belts to cause the strip to be folded transversely upon itself between the belts in said second positions.

10. In an olive stuffing machine having a stuffing station and means for individually delivering olives, each having an internal cavity communicating with the exterior thereof through a mouth, to the stuffing station at predetermined intervals with the mouths thereof disposed in a predetermined attitude, a stuffing apparatus comprising a housing mounted on the machine in spaced relation to the stuffing station and having a passage extended therethrough along an axis in alignment with the mouth of an olive disposed in said predetermined attitude in the stuffing station and a slot communicating with the passage to form a loading station in the passage; a plunger, having a work end, slidably received in the passage for movement between a retracted position, in which the work end is disposed on the opposite side of the loading station from the stuffing station, and an extended position in which the work end is disposed in juxtaposition to the mouth of an olive in said predetermined position in the stuffing station; means connected to the plunger for moving the plunger between said retracted and extended positions at predetermined intervals corresponding to said predetermined interval of olive delivery to the stuffing station; a conveyor assembly disposed in feeding relation to the slot of the housing and adapted to transport a ribbon of stuffing material therealong endwardly into the loading station through the slot; means connected to the conveyor assembly for driving the conveyor assembly in increments of stepped progression whereby the conveyor assembly delivers the ribbon to the loading station at predetermined intervals between the intervals of movement of the plunger to and from the extended position; a cutting blade slidably received in the housing for movement to and from a severing position substantially tangential to the loading station; means for moving the cutting blade to and from the severing position, to sever the portion of the ribbon received in the loading station into a segment of said material in the loading station, at predetermined intervals individually subsequent to said interval of delivery of the ribbon to the loading station and prior to said interval of movement of the plunger to the extended position; and a dilating assembly disposed between the housing and the stuffing station and operable to engage an olive in the stuffing station to dilate the mouth thereof prior to movement of the plunger to the extended position whereby each segment of stuffing material subsequent to severing is forced by the work end of the plunger from the loading station to the stuffing station through the mouth of an olive received in the stuffing station, dilated by the dilating assembly, and into the cavity thereof.

11. In an olive stuffing machine having a stuffing station and means for individually delivering olives, each having an internal cavity communicating with the exterior thereof through a mouth, to the stuffing station at predetermined intervals with the mouths thereof disposed in a predetermined attitude, a stuffing apparatus comprising a housing mounted on the machine in spaced relation to the stuffing station and having a passage extended therethrough along an axis in alignment with the mouth of an olive disposed in said predetermined attitude in the stuffing station and a slot communicating with the passage to form a loading station in the passage; a plunger, having a work end, slidably received in the passage for movement between a retracted position, in which the work end is disposed on the opposite side of the loading station from the stuffing station, and an extended position in which the work end is disposed in juxtaposition to the mouth of an olive in said predetermined position in the stuffing station; means connected to the plunger for moving the plunger between said retracted and extended positions at predetermined intervals corresponding to said predetermined interval of olive delivery to the stuffing station; a conveyor assembly disposed in feeding relation to the slot of the housing and adapted to transport a ribbon of stuffing material therealong endwardly into the loading station through the slot; means connected to the conveyor assembly for driving the conveyor assembly in increments of stepped progression whereby the conveyor assembly delivers the ribbon to the loading station at predetermined intervals between the intervals of movement of the plunger to and from the extended position; a cutting blade slidably received in the housing for movement to and from a severing position substantially tangential to the loading station; means for moving the cutting blade to and from the severing position, to sever the portion of the ribbon received in the loading station into a segment of said material in the loading station, at predetermined intervals individually subsequent to said interval of delivery of the ribbon to the loading station and prior to said interval of movement of the plunger to the extended position; and a dilating assembly disposed between the housing and the stuffing station and operable to engage an olive in the stuffing station to dilate the mouth thereof prior to movement of the plunger to the extended position whereby each segment of stuffing material subsequent to severing is forced by the work end of the plunger from the loading station to the stuffing station through the mouth of an olive received in the stuffing station, dilated by the dilating assembly, and into the cavity thereof wherein the dilating assembly has a plurality of fingers mounted for movement thereon into and from the mouth of an olive in said stuffing position and the dilating assembly has guides individual to the fingers borne by a frame pivotal substantially about the axis of the passage of the housing to cause movement of the fingers from each other to cause said dilation.

12. The stuffing apparatus of claim 11 wherein the dilating assembly has a recess substantially concentric to the axis of the passage and means are borne by the machine for moving the dilating assembly to the stuffing station subsequent to said delivery of each olive to the stuffing station until the olive is received in the recess to stabilize said olive prior to dilation of the mouth thereof by said fingers.

13. The stuffing apparatus of claim 12 wherein the conveyor assembly includes a first conveyor adapted to deliver a continuous ribbon of stuffing material and a second conveyor disposed in receiving relation to the first conveyor and having a pair of continuous belts disposed in side-by-side relation and having a run wherein said belts are disposed in substantially coplanar relation and in receiving relation to the ribbon delivered by the first conveyor and are traveled therefrom into positions of spaced juxtaposition with the ribbon folded therebetween in aligned feeding relation to the slot of the housing.

14. The stuffing mechanism of claim 13 wherein a mandrel is borne by the machine in juxtaposition to the coplanar position of the belts and is extended toward the belts to form a guide surface in the direction of the slot of the housing between said juxtaposed portions of the belts and about which the ribbon is folded by the belts.

15. In an apparatus for stuffing pitted olives and the like having stuffing receiving cavities therein, a dilating and stuffing device comprising (a) means for successively positioning the olives at a stuffing station with the cavities disposed in a common direction;

(b) a dilating mechanism having a plurality of fingers movable toward and from said cavities and substantially equally spaced about an axis aligned with the stuffing station disposed in sufficient proximity to each other to be received by the cavities of successive olives positioned therein, said fingers being movable toward and from each other and defining a passage longitudinally thereof therebetween;

(c) means for injecting stuffing material through said passage; and (d) sequencing means for synchronously moving the fingers toward the axis to constrict the fingers about the passage, inserting the fingers along the axis into the cavity of an olive disposed at the stuffing station, spreading the fingers to dilate the cavity, injecting stuffing material into the cavity through the passage, withdrawing the fingers along the axis from the cavity, and indexing the resultant stuffed olive from the stuffing station and a successive pitted olive to said station.

* * * * *

UNITED STATES PATENT AND TRADEMARK OFFICE
CERTIFICATE OF CORRECTION

PATENT NO. : 4,102,257
DATED : July 25, 1978
INVENTOR(S) : Clemente del Ser Gonzalez It is certified that error appears in the above-identified patent and that said Letters Patent are hereby corrected as shown below:

Column 11, line 44, change "sequency" to ---sequence---.

Signed and Sealed this

Sixth Day of February 1979

[SEAL]

Attest:

RUTH C. MASON
Attesting Officer

DONALD W. BANNER
Commissioner of Patents and Trademarks